United States Patent [19]
Hall

[11] 3,934,626
[45] Jan. 27, 1976

[54] ANTI-DRIP INJECTION NOZZLE FOR PLASTIC MOLDING

[76] Inventor: John L. Hall, 1491 Mar Vista Ave., Pasadena, Calif. 91104

[22] Filed: May 17, 1974

[21] Appl. No.: 470,842

[52] U.S. Cl. ............... 141/117; 141/354; 164/337; 251/354; 425/245
[51] Int. Cl.² .................. B65B 3/04; B65B 39/02
[58] Field of Search ........................ 164/304, 337; 141/115–117, 193, 270, 275, 291, 292, 294, 351–355, 360, 392; 251/347, 348, 353, 354; 425/245, 246

[56] References Cited
UNITED STATES PATENTS

| | | | |
|---|---|---|---|
| 2,821,750 | 2/1958 | Huelskamp | 425/247 X |
| 3,416,577 | 12/1968 | Franz | 141/117 |

FOREIGN PATENTS OR APPLICATIONS

| | | | |
|---|---|---|---|
| 325,240 | 2/1930 | United Kingdom | 141/351 |

Primary Examiner—Richard E. Aegerter
Assistant Examiner—Frederick R. Schmidt
Attorney, Agent, or Firm—Allan M. Shapiro

[57] ABSTRACT

An axially compliant injection nozzle for plastic molding machines incorporating a valve actuated by differential motion between the mold and the conditioning chamber comprises a tappet engaged on the stem of that valve and entrapping a valve spring between the valve seat and the tappet. The nozzle has a sliding fit with a bore in the tappet head and is biased away from the latter by a secondary spring. The action of the secondary spring aids in maintaining good sealing contact between the nozzle and the sprue bushing and during the injection period despite variations in the lock-up force between the nozzle and the sprue, and retains such contact subsequent to injection so as to prevent plastic drip due to backflow.

4 Claims, 3 Drawing Figures

ANTI-DRIP INJECTION NOZZLE FOR PLASTIC MOLDING

BACKGROUND OF THE INVENTION

1. Field of the Invention

The instant invention relates to discharge nozzles adapted for use in injection molding machines for plastic materials. It relates, more particularly, to such nozzles equipped with integral valves for the release of the plastic material from the pressure chamber of the molding machine into the mold sprue, through the nozzle.

2. Description of the Prior Art

In the prior art it has been known to provide for injection molding of plastic parts by means of a machine in which an injection nozzle is aligned with the orifice of the mold sprue bushing and in which the injection cycle is initiated and terminated by relative, reciprocal motion between the mold and the nozzle. In such machines the mold acts as a cam entraining the nozzle, acting as a tappet, into operating a valve which is interposed between the chamber containing the molten plastic composition and the discharge orifice of the nozzle.

Such devices have a number of drawbacks such as, for example, relative motion requires guides and actuators with inherent inaccuracies, and the drive mechanisms and lock-up mechanisms which ensure sealing between the nozzle and sprue often induce vibrations. The seal between the nozzle and the sprue may be adversely affected by such vibrations and mechanical imperfections. Importantly, once injection has ceased, the retraction of the nozzle permits backflow of plastic through the sprue so that plastic material may be lost from the nozzle and represent a loss, a potential hazard to workmen and downtime of the equipment during cleanup.

It is, therefore, a primary object of the invention to overcome the aforementioned disadvantages associated with the injection nozzles of the prior art and to teach the construction of such devices for preventing drip of plastic due to inadequate seals.

It is a further object of the invention to provide such improved injection nozzles at a reasonable cost and in a form convenient in manufacture and use.

SUMMARY OF THE INVENTION

The invention attains its objects by providing a separation between the functions of the injection nozzle proper and the tappet which operates the automatic valve through a hollow valve stem. In the devices of the prior art, the nozzle head itself serves as the tappet.

In the preferred embodiment of the invention, the nozzle head is slideably engaged with the tappet and a secondary spring, to distinguish it from the primary spring between the tappet and the valve seat, is interposed between the two parts.

In use, the hemispherical tip of the injection nozzle approaches the concave seat of the sprue bushing and, upon contact therewith and further movement, begins to move the nozzle towards the tappet, compressing the secondary spring in the process. When the force exerted by the secondary spring exceeds the break-out load of the primary spring, the tappet also begins to move, lifting the valve off its seat and permitting molten plastic to enter the injection passage composed of coaxial orifices in the valve stem, the tappet and the nozzle.

The secondary spring is arranged to have a lower spring rate than the primary, acts on a much smaller mass than the valve spring of the conventional design and is not subject to the viscous damping imposed upon motions of the valve head. As a result, the effective response rate, i.e., the ability of the nozzle to adapt to rapid, if small, vibratory motions of the mold sprue relative to the pressure chamber, is greatly improved and firm sealing contact between the sprue and the nozzle ensured.

Most importantly, upon termination of plastic injection, caused by sufficient partial separation of the valve and the sprue bushing so as to permit spring closure of the valve, the secondary spring retains sealing contact between the nozzle of the sprue bushing to prevent plastic drip caused by partial backflow through the sprue or otherwise.

The characteristics of the two-piece, axially compliant injection nozzle of the invention may be varied over a substantial range by altering the dimensions, masses, stiffnesses and the other characteristics of the several members, thereby attuning its performance to diverse requirements. Experiments indicate that a spring rate of the secondary spring of not more than 1/2 of the spring rate of the primary spring gives very satisfactory results and optimal performance.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
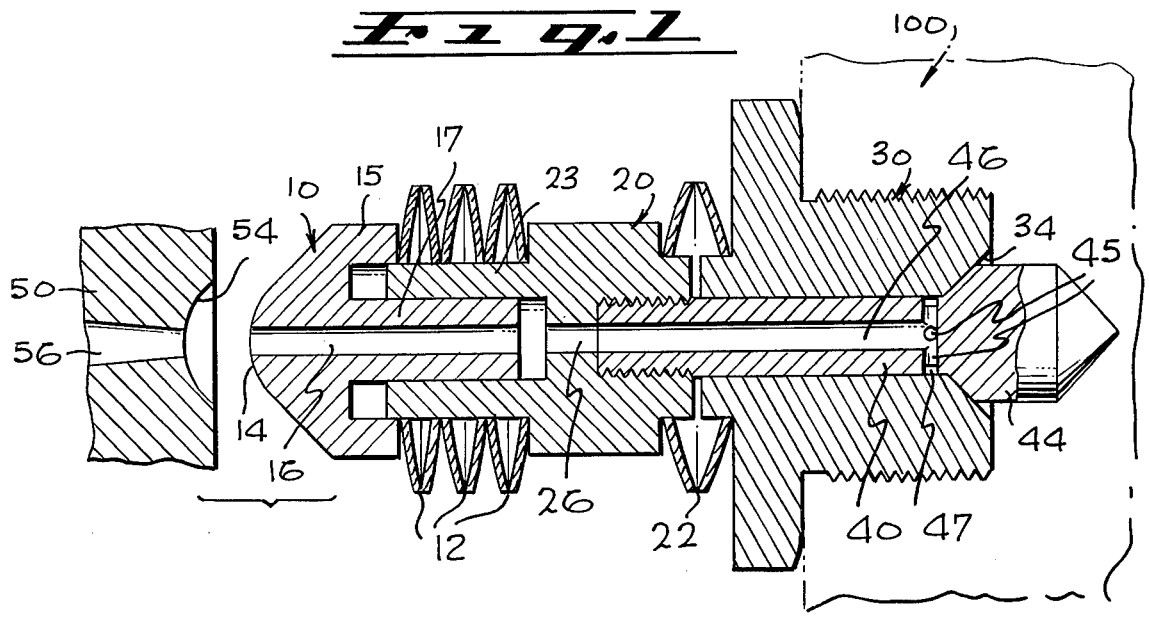
FIG. 1 is a longitudinal section through the plastic injection nozzle of the invention, including the valve associated therewith and a portion of the sprue bushing of the injection mold, the several parts being shown in the separated position occupied before commencing operations.
Figure 2:
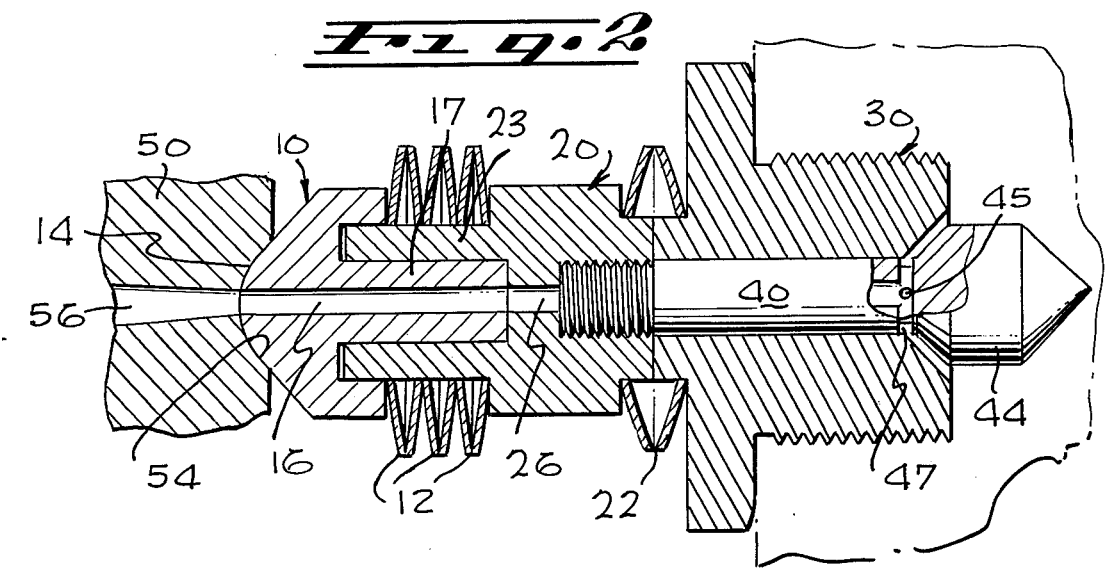
FIG. 2 is another longitudinal section through the same assembly, showing the position the parts assume during the injection of molten plastic into the mold.
Figure 3:
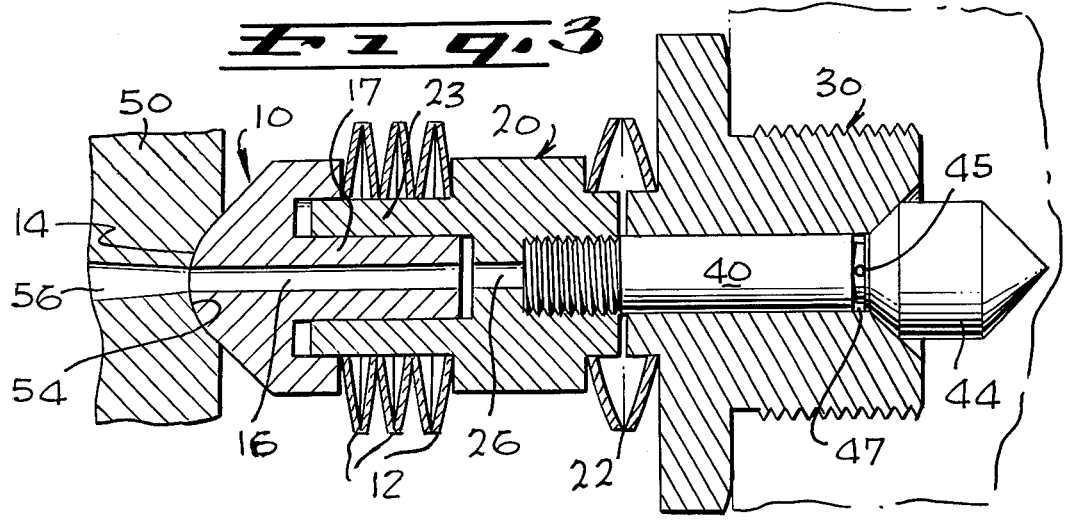
FIG. 3 is another longitudinal section through the assembly, showing the parts with the valve closed and the nozzle in sealed engagement with the sprue bushing.

The preferred embodiment of the invention is shown in the Figures of the accompanying drawings in three positions typical of the operating cycle. FIG. 1 is a transverse section through the nozzle and valve assembly in the "no-flow" position, FIG. 2 is a similar section showing the components parts in the relative positions they assume while the plastic material is injected into the mold from the conditioning chamber of the molding machine, and FIG. 3 shows the assembly between "shots" of plastic, i.e., after the valve is closed at the end of plastic injection.

Referring to FIG. 1, the assembly includes a valve block 30 firmly engaged in the peripheral wall of a conditioning chamber 100. The conditioning chamber is kept filled with molten plastic composition by means of a plasticizing screw, heaters, plunger pumps, or other components of a conventional injection molding machine which form no part of the instant invention and are well known in the art.

The valve block is pierced by a longitudinal orifice, the inboard end of which is shaped into a conical, concentric valve seat 34. A valve stem 40 is reciprocably mounted in the aforementioned orifice of the valve block and carries a valve head 44 which fits in the valve seat 34. A central bore 46 is machined into the outboard end of the valve stem 40 and reaches to just below the valve head 44. The bore 46 communicates with a circumferential groove 47, undercutting the valve stem 40, through transverse orifices 45.

A tappet block 20 is threaded onto the outboard end of the stem 40 and is provided with a central bore 26 in line with the corresponding bore 46 of the latter part. A spring 22, shown as consisting of a pair of identical Belleville washers but of arbitrary form, is entrapped between the tappet block 20 and the valve block 30, its initial compression adjustible by means of the threaded engagement of the valve stem in the tappet.

The preload or initial compression of the spring 22 ensures a tight closure between the valve head 44 and the seat 34, aided by the unbalanced hydraulic force of the plastic inside the conditioning chamber 100.

A nozzle head 10 and a secondary spring 12 complete the assembly. The nozzle head is machined with a hemispherical face 14 and with a tubular rearward extension 17 which, in turn, is a sliding fit in a counterbore in a cylindrical, forward portion 23 of the tappet block 20. A peripheral skirt 15 of the nozzle head encompasses the outer surface of the tappet block extension 23 and entraps the spring 12 between the nozzle head and the tappet.

The spring 12, hereinafter referred to as the secondary spring of the assembly, is shown as formed of three pairs of Belleville disks similar to those employed in the primary spring 22 but is, again, of arbitrary design. The function of the secondary spring 12 is in opposing the motion of the nozzle head 10 toward the tappet block 20.

The injection cycle of the molding machine is initiated by locking up the mold (conventional in construction and not illustrated for the sake of clarity) and inducing relative movement between the mold and the conditioning chamber. The mechanism for accomplishing this relative motion may be mechanical or hydraulic, or of any other form known to the practitioners of the molding art.

Within the case of the mold, a sprue bushing 50 of conventional design is arranged coaxially and initially spaced from the nozzle head 10. An orifice 56 in the sprue bushing is aligned with the orifice 16 of the nozzle and the concave seat 54 of the bushing is adapted to mate effectively with the hemispherical end 14 of the nozzle.

As the nozzle advances towards the sprue bushing, or vice versa, and an axial force is developed between the two members upon contact, the extension 17 moves into the counterbore of the tappet block and the secondary spring 12 is compressed. At some point during this compression, the force on the secondary spring 12 exceeds the break-out force of the primary spring 22 and, consequently, the tappet 20 begins to move toward the valve block 30, lifting the valve head 44 from its seat until the parts arrive at the positions illustrated in FIG. 2.

As the valve head lifts from the valve seat, the molten plastic material held in the chamber 100 begins to flow into the undercut 47 and through the channel formed by the aligned passages 45, 46, 26, 16, and 56 into the mold cavity.

The forces on the primary and secondary springs in this condition are governed primarily by the mechanical effort exerted by the locking mechanism. This lockup force is affected by many factors, however, including the hydraulic separating force exerted by the flowing plastic, which reaches a maximum as the mold is completely filled. Other forces are exerted by the operation and compliance of the mechanical or hydraulic members accomplishing the lockup.

As a result of the action of these outside influences, the relative axial positions of the sprue bushing and nozzle head may change in a small, but functionally important, range. It is one of the functions of the secondary spring 12 to accomodate these changes and to ensure intimate contact between the mating faces 14 and 54, without a concomitant motion on the part of the primary spring 22 which would affect the feed rate of the plastic material through the valve and thereby influence the quality of the molded part.

By arranging the spring rate of the secondary spring at a much lower value than that of the primary, it is possible to permit a relatively large motion of the nozzle head 10 with a very small motion of the valve head 44, especially since the latter is strongly damped by being immersed in a highly viscous fluid, i.e., the molten plastic.

Similarly, the relative difference in the rates and, therefore, the travel of the primary and secondary springs ensures that sealing contact between the sprue bushing and nozzle is not lost at that point in the cycle where the valve 44 has just been reseated, as illustrated in FIG. 3. This prevents the undesirable and potentially dangerous "afterdrip" of plastic from between the sprue bushing 50 and the nozzle 10, such prevention being accomplished by maintaining the sealing engagement between the nozzle 10 and the sprue bushing 50 via the force of secondary spring 12.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An anti-drip plastic material injection nozzle for pressing against the sprue bushing of a plastic-receiving mold comprising:

a valve block for securement to a plastic conditioning chamber containing molten plastic, a first central bore through said valve block, a valve seat terminating said first central bore at its conditioning chamber end;

a valve stem disposed within said first central bore in slidable engagement with said valve block and having a valve head on one end adapted to seat against said valve seat and having a second and opposite end exterior of said valve block, said valve stem having a second central bore coaxial with said first central bore and extending from said second end to said valve head;

a tappet block mounted on said second end of said valve stem, a third central bore through said tappet block and in alignment with said second central bore;

a primary spring disposed between said valve block and said tappet block in compression so as to tend to maintain separation between said tappet block and said valve block for tending to maintain said valve head against said valve seat;

a nozzle head mounted on said tappet block in longitudinally slidable engagement therewith and having a fourth central bore therethrough in alignment with said third central bore; and a secondary spring mounted between said tappet block and said nozzle head and tending to urge said nozzle head away from said tappet block, said secondary spring having a lower spring rate than said primary spring so that said secondary spring acts to maintain sealing engagement between said nozzle head and said sprue bushing effectively independently of said primary spring, and such plastic material being confined in its travel from such conditioning chamber through said aligned bores to said sprue bushing.

2. The nozzle defined in claim 1 wherein:

said second end of said valve stem is threaded;

said tappet block is threadably mounted on said second end of said valve stem so that the initial separation between said tappet block and said valve block is adjusted by threaded location of said tappet block on said valve stem for adjustment of the closing force of said primary spring.

3. The nozzle defined in claim 2 wherein the stiffness of said secondary spring is not more than one-half of the stiffness of said primary spring.

4. The discharge nozzle defined in claim 1, wherein the stiffness of said secondary spring is not more than one-half of the stiffness of said primary spring.

* * * * *